US012720514B2

(12) United States Patent
Wiacek

(10) Patent No.: US 12,720,514 B2
(45) Date of Patent: Aug. 25, 2026

(54) FLEXIBLE REFERENCE FREQUENCY ALLOCATION FOR SMART JAMMING MITIGATION

(71) Applicant: Nokia Technologies Oy, Espoo (FI)

(72) Inventor: Fabian Wiacek, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 299 days.

(21) Appl. No.: 18/533,308

(22) Filed: Dec. 8, 2023

(65) Prior Publication Data

US 2024/0244602 A1 Jul. 18, 2024

(30) Foreign Application Priority Data

Jan. 13, 2023 (FI) .................................... 20235035

(51) Int. Cl.
*H04W 72/0453* (2023.01)

(52) U.S. Cl.
CPC .............................. *H04W 72/0453* (2013.01)

(58) Field of Classification Search
CPC ........... H04L 5/0007; H04W 72/0453; H04W 72/21; H04W 72/23
See application file for complete search history.

(56) References Cited

U.S. PATENT DOCUMENTS 2,292,387 A 8/1942 Markey et al.
12,010,705 B2* 6/2024 Sengupta ................. H04L 1/04
2008/0014877 A1 1/2008 Hulkkonen et al.
2010/0284349 A1 11/2010 Niemela et al.
2014/0286377 A1 9/2014 Shaffer et al.
2018/0279363 A1* 9/2018 Su ........................ H04L 5/0053
2019/0253908 A1 8/2019 Fan et al.
2021/0105772 A1 4/2021 Wong et al.
2021/0274568 A1* 9/2021 Sengupta ........... H04W 56/005
2021/0385815 A1 12/2021 Rico Alvarino et al.
2022/0326333 A1 10/2022 Liu et al.

FOREIGN PATENT DOCUMENTS

EP 3332588 B1 3/2022
WO 2016/159611 A1 10/2016
WO 2017/029036 A1 2/2017
WO 2021/029779 A1 2/2021

OTHER PUBLICATIONS

Extended European Search Report received for corresponding European Patent Application No. 23215460.9, dated Jun. 6, 2024, 7 pages.

(Continued)

*Primary Examiner* — Margaret G Webb
(74) *Attorney, Agent, or Firm* — Barta Jones, PLLC

(57) ABSTRACT

Various techniques are provided for a method that may include generating an additional frequency shift for wireless transmission, generating a frequency shift pattern based on a standard carrier frequency and the additional frequency shift, communicating, by a base station to a user equipment, information related to the additional frequency shift, and communicating, by the base station to the user equipment, a data stream using the frequency shift pattern.

18 Claims, 9 Drawing Sheets

Configure additional frequency shift pattern for wireless transmissions — S405

Communicate information related to additional frequency shift pattern for wireless transmissions — S410

Apply additional frequency shift pattern for wireless transmissions — S415

(56) References Cited

OTHER PUBLICATIONS

Navda et al., "Using Channel Hopping to Increase 802.11 Resilience to Jamming Attacks", 26th IEEE International Conference on Computer Communications, May 6-12, 2007, pp. 2526-2530.
Zou et al., "A Survey on Wireless Security: Technical Challenges, Recent Advances and Future Trends", arXiv, Apr. 23, 2016, pp. 1-36.
"3rd Generation Partnership Project; Technical Specification Group Radio Access Network; NR; Base Station (BS) radio transmission and reception (Release 17)", 3GPP TS 38.104, V17.7.0, Sep. 2022, pp. 1-359.
Nallabolu et al., "A Frequency-Domain Spoofing Attack on FMCW Radars and Its Mitigation Technique Based on a Hybrid-Chirp Waveform", IEEE Transactions on Microwave Theory and Techniques, vol. 69, No. 11, Nov. 2021, pp. 5086-5098.
Jiang et al., "Research on Multiple-Phase-Sectionalized- Modulation Based Frequency Shift Jamming Method for Pulse Compression Radar", 6th International Conference on Systems and Informatics (ICSAI), Nov. 2-4, 2019, 6 pages.
Office action received for corresponding Finnish Application No. 20235035, dated Jun. 13, 2023, 10 pages.

* cited by examiner

FLEXIBLE REFERENCE FREQUENCY ALLOCATION FOR SMART JAMMING MITIGATION

TECHNICAL FIELD

This application was originally filed as a FI national application No. 20235035 filed on Jan. 13, 2023, which is hereby incorporated in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IOT) and may offer new types of mission-critical services. For example, ultra-reliable and low-latency communications (URLLC) devices may require high reliability and very low latency. The continued mobile broadband evolution can also include 5G-Advanced, 6G, and beyond.

SUMMARY

According to an example embodiment, a method may include generating an additional frequency shift for wireless transmission, generating a frequency shift pattern based on a standard carrier frequency and the additional frequency shift, communicating, by a base station to a user equipment, information related to the additional frequency shift, and communicating, by the base station to the user equipment, a data stream using the frequency shift pattern.

According to another example embodiment, a method may include receiving, by a user equipment from a base station, information related to an additional frequency shift, generating a frequency shift pattern based on a standard carrier frequency and the additional frequency shift, and configuring a band pass filter based on the frequency shift pattern.

The details of one or more examples of embodiments are set forth in the accompanying drawings and the description below. Other features will be apparent from the description and drawings, and from the claims.

DETAILED DESCRIPTION

Figure 1:
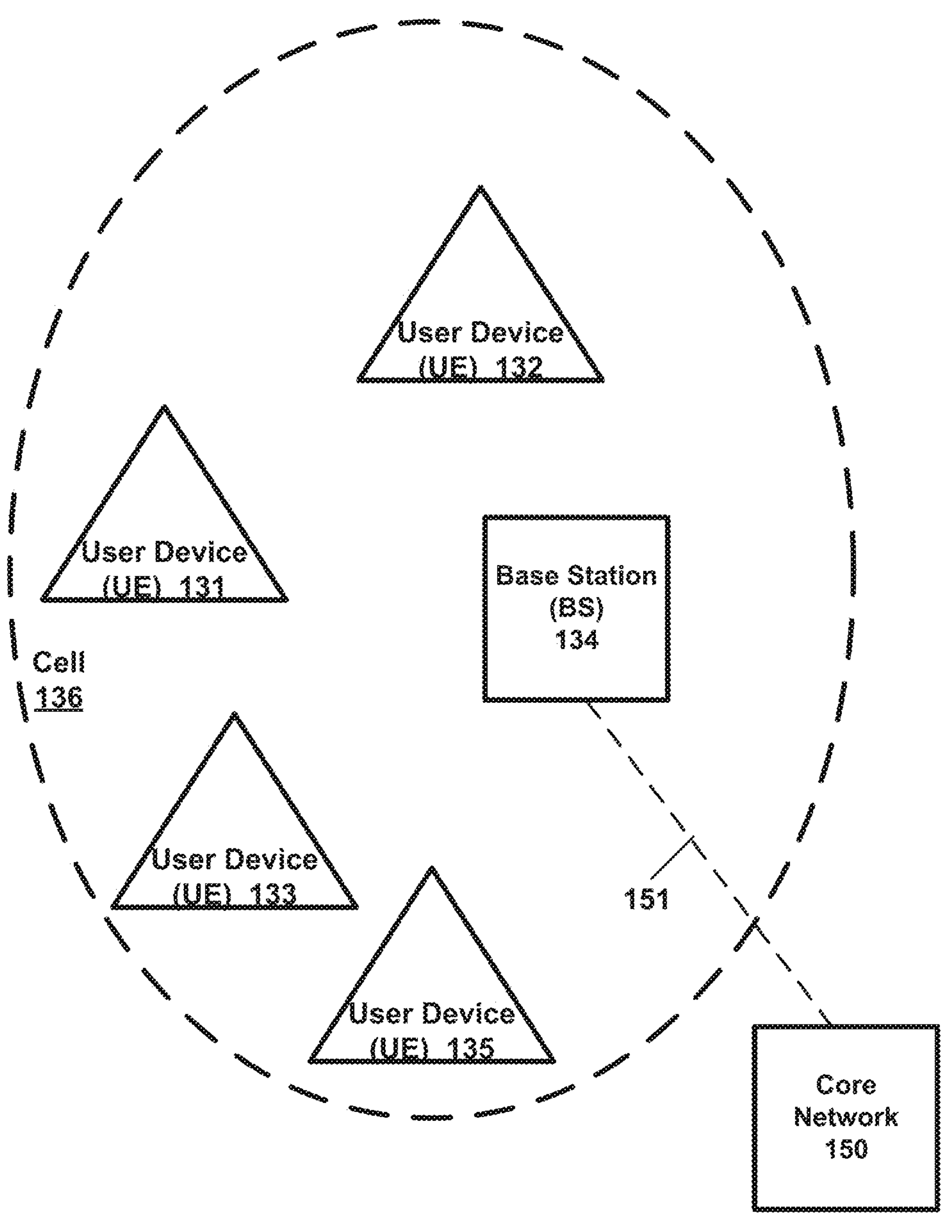
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, cNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IOT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications)

may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

Figure 2A:
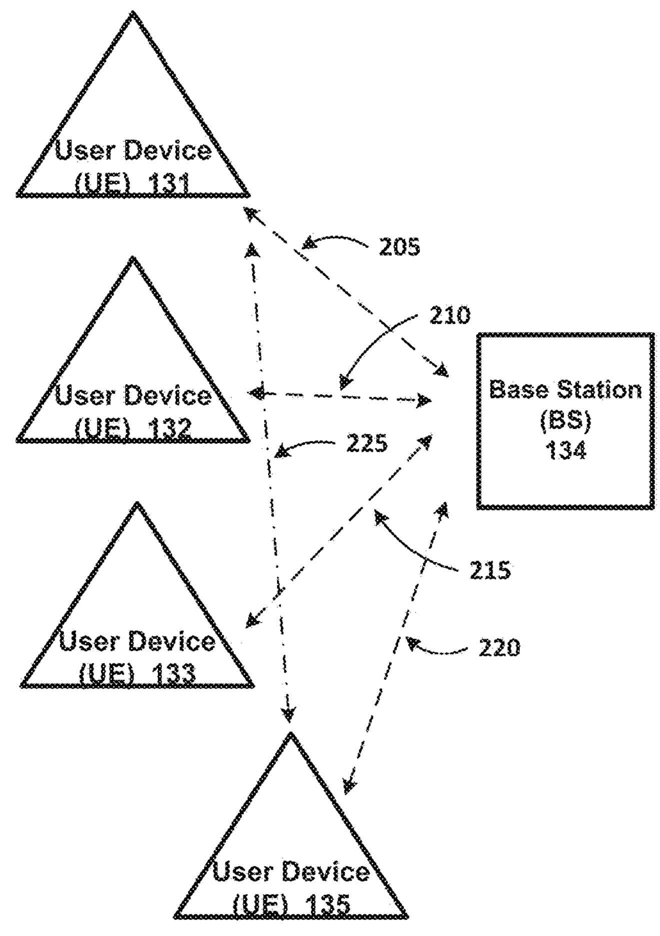
FIG. 2A is a block diagram of the wireless network including used radio resources/frequencies according to an example embodiment.

FIG. 2A is a block diagram of the wireless network including used radio resources/frequencies according to an example embodiment. As shown in FIG. 2A, the BS 134 is communicating with UE 131, UE 132, UE 133, and UE 135 using radio resource 205, radio resource 210, radio resource 215, and radio resource 220, respectively. Radio resource 205, radio resource 210, radio resource 215, and radio resource 220 can be using a reference frequency (FREE). The reference frequency can be the same or different for each radio resource. In an example implementation, the reference frequency can be a standard frequency (e.g., a frequency described in a communication standard, a 5G standard, and the like). FIG. 2A further illustrates a jamming signal 225 that is generated and transmitted by UE 135. The jamming signal 225 can be configured to disrupt communication between the BS 134 and the UE 131, 132, 133. In an example implementation, the reference frequency can be modified (e.g., shifted) to prevent the jamming signal 225 from disrupting communication between the BS 134 and the UE 131, 132, 133.

For example, 5G/LTE communication can be efficient but may also be vulnerable, mostly due predictable signal pattern and band allocation, which means that such transmissions may be jammed somewhat easily, radio interface may be eavesdropped somewhat easily, and there can be a risk of false signal injections at the given radio resources. A Commercial 5G/LTE wireless network may not be prepared for dealing with jamming that targets certain radio resources such as primary and secondary synchronization signals (PSS, SSS), Physical Broadcast Channel (PBCH), or RACH. In practice, jamming can be perceived similar to interferences and the only protection is that purposeful jamming is prohibited by law. In addition, typical antijamming reaction (increasing-TX power, changing modulation, usage of frequency hopping, retransmissions, etc.) may be predictable and overcome by some jamming technologies, as smart jammer (e.g., narrow band jamming) can adapt jamming pattern based on detected countermeasures applied by BS 134 or UE 131, 132, 133. In example implementations, jamming can refer to smart jamming, which can be narrowband, synchronous and targeted jamming of particular BS/UE signals at specified radio resources, which position can be easily determined. In addition, jamming can be wideband, which is similar to interferences, but this form of jamming can be less effective, as all band needs to be jammed. By contrast, smart jamming may be applied to particular radio resources which can disturb or even terminate connection within entire cell.

The problem with PSS/SSS jamming may be mitigated by dynamically allocation of additional synchronization signals but in case of some jamming technologies, their presence may be also detected by cell configuration detection. Thus, this method may help only in case random interferences. Another distressing fact is that some jamming technologies can be simple in construction and require very low transmission power to efficiently jam the given cell signal.

In this context, there is a risk that some jamming technologies will be used as new kind of threat like hackers Denial of Service (DOS) attack, or Distributed Denial of Service (DDOS) attack, if more jamming devices will be used simultaneously, which drain radio resources or prevent from connection establishment, especially in case of sensitive, valuable, or critical wireless networks used for public safety, government, military, or even private networks. In another words, it is expected that there will likely be more jamming technologies configured to attack on 5G/LTE network infrastructure, if no efficient antijamming solution is applied. Jamming can be a technical issue. However, a jamming attack may be perceived as a preceding action (e.g., before other, more severe threats occur) especially when considering sensitive, vulnerable and critical networks. Therefore, even short-term jamming may have significant impact on users of such networks.

The frequency bands that are used in commercial 5G/LTE network are described in the standards (e.g., 3GPP TS 38.104). This can be sufficient for some jamming technologies (e.g., implemented in UE 135) to initialize a jamming attack on 5G/LTE cell. In this example, the jamming technologies may be configured to detect cell signal, synchronize with the cell signal and disturb communication for an authorized UE (e.g., UE 131).

Revealing and standardizing cell configuration to allow free access for commercial UEs to the commercial networks for requested services or connections may be desirable. In addition, reasonable restrictions to some data or patterns for crucial or sensitive networks, where only the authorized UEs and the authorized users have access may also be desirable. However, standard protections may be overcome by some jamming technologies configured to fake some data. Therefore, there is a need for efficient solution, which prevent or mitigate potential impact of some jamming technologies on 5G/LTE wireless communications dedicated for sensitive and crucial networks, where only trusted UEs should have access. In an example implementation, a frequency shifting technique can be used to prevent or mitigate the impact of some jamming technologies on wireless communications.

Figure 2B:
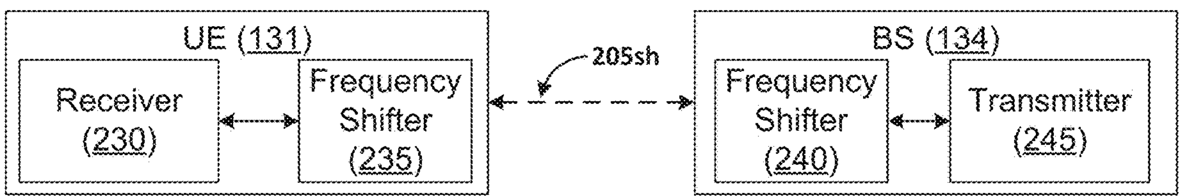
FIG. 2B is a block diagram of communication between a base station transmitter and a user equipment receiver according to an example embodiment.

FIG. 2B is a block diagram of communication between a base station transmitter and a user equipment receiver according to an example embodiment. As an example, UE 131 can include a receiver and a frequency shifter 235. Further, the BS 134 can include a transmitter 245 and a frequency shifter 240. The frequency shifter 235 and the frequency shifter 240 can be configured to enable the BS 134 and the UE 131 to communicate using radio resource 205*sh*. The radio resource 205*sh* can use a shifted reference frequency. The shifted reference frequency can be used to prevent the jamming signal 225 from disrupting communication between the BS 134 and the UE 131. In an example implementation, only the BS 134 and the UE 131 are configured to use shifted reference frequency and the UE 135 may not (or have significant difficulty) be able to determine (e.g., predict) shifted reference frequency. Therefore, UE 135 may not generate the jamming signal 225 such that the jamming signal 225 may not disrupt communication between the BS 134 and the UE 131.

In some implementations, a UE and/or a BS may be an authorized UE and/or an authorized BS. For example, in the implementation of FIG. 2B, the BS 134 and the UE 131 can be an authorized BS and an authorized UE, respectively. One of the other UEs (e.g., UE 132 and/or UE 133) may not be an authorized UE. As such, the other UEs (e.g., UE 132 and/or UE 133) may be susceptible to being jammed by UE 135 using the jamming signal 225. In some example implementations, the BS 134 can communicate (e.g., communicate a data stream) with the UE 131, 132, 133 using a transmitter signal frequency (e.g., a reference frequency). Further, the UE 131, 132, 133 can be configured to receive the communication using, for example, a comb band pass filter. The comb band pass filter can be tuned to the transmitter signal frequency.

Figure 3A:
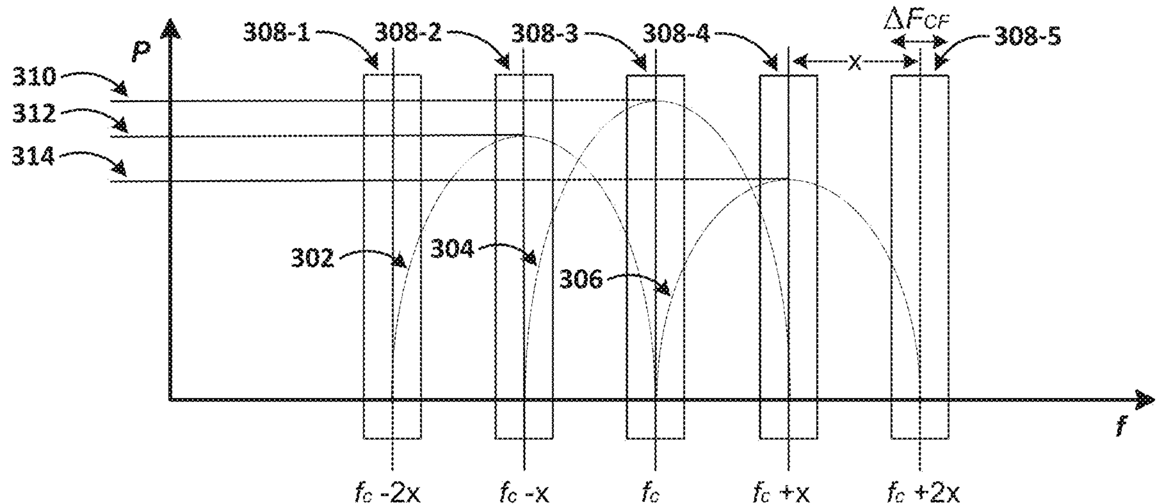
FIG. 3A is a signal graph signal reception according to an example embodiment.

FIG. 3A is a signal graph of signal reception according to an example embodiment. As shown in FIG. 3A, a signal graph of power (P) over frequency (f) includes signals 302, 304, 306 communicated by a BS (e.g., BS 134) using transmitter signal frequencies $f_c$−x, $f_c$, and $f_c$+x (where $f_c$ is a center frequency and x is a subcarrier spacing), respectively. The signal graph further includes band pass filters 308-1, 308-2, 308-3, 308-4, 308-5 (e.g., as a comb band pass filter) having center frequencies $f_c$−2x, $f_c$−x, $f_c$, $f_c$+x, and $f_c$+2x and a bandwidth $\Delta F_{CF}$.

For example, in 5G/LTE, the first step of a cell search procedure can be to tune to the strongest signal frequency (e.g., a reference frequency) detected by the UE frequency carrier. To support this process, reference frequency ($F_{REF}$) can be used, which is used, to identify frequencies, which should be checked in the given band. As described above, FIG. 3A illustrates the principles for Orthogonal Frequency Division Multiplexing (OFDM) signal reception, in which receiver tune comb band pass filter characterized by $\Delta F_{CF}$, to received carrier frequency and subcarrier frequencies separated by subcarrier spacing x. In the result signal sampling can be optimal due high Signal to Noise Ratio (SNR), which is reflected by power measurement P. In an example implementation, $f_c$, x, and $\Delta F_{CF}$ can be defined by a standard. Further, an example implementation can include using a frequency shift ($f_{sh}$) that known by an authorized BS and an authorized UE. In addition, the frequency shift ($f_{sh}$) is unknown by other devices and can be difficult (or nearly impossible) for some jamming technologies to determine and/or predict.

Figure 3B:
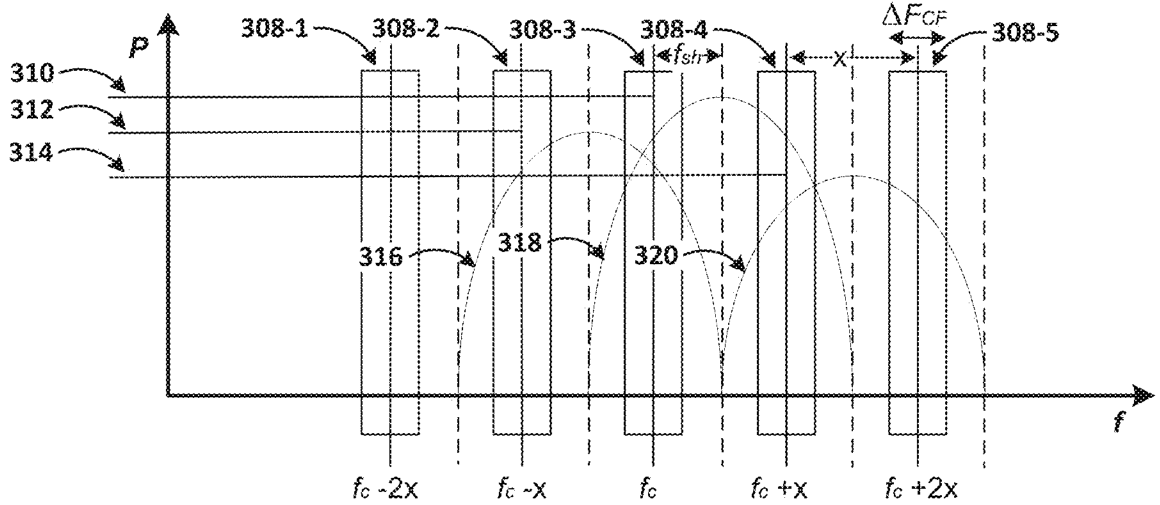
FIG. 3B is a signal graph of signal reception including a transmitter frequency shift according to an example embodiment.

FIG. 3B is a signal graph of signal reception including a transmitter frequency shift according to an example embodiment. As shown in FIG. 3B, a signal graph of power (P) over frequency (f) includes signals 316, 318, 320 communicated by a BS (e.g., BS 134) using transmitter signal frequencies $f_c$−x+$f_{sh}$, $f_c$+$f_{sh}$, and $f_c$+x+$f_{sh}$ (where $f_c$ is a center frequency, x is a subcarrier spacing, and $f_{sh}$ is a frequency shift), respectively. Accordingly, signals 316, 318, 320 can correspond to signals 302, 304, 306 shifted by the frequency shift ($f_{sh}$).

Figure 3C:
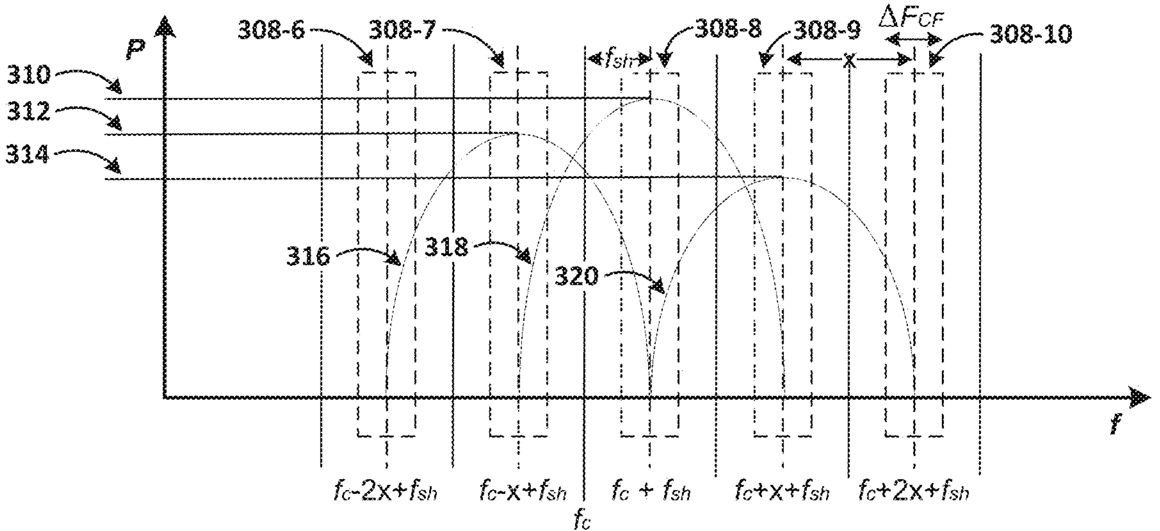
FIG. 3C is a signal graph of signal reception including a transmitter and receiver frequency shift according to an example embodiment.

FIG. 3C is a signal graph of signal reception including a transmitter and receiver frequency shift according to an example embodiment. The signal graph of FIG. 3C includes the elements of FIG. 3B and further includes band pass filters 308-6, 308-7, 308-8, 308-9, 308-10 (e.g., as a comb band pass filter) having center frequencies $f_c$−2x+$f_{sh}$, $f_c$−x+$f_{sh}$, $f_c$+$f_{sh}$, $f_c$+x+$f_{sh}$, and $f_c$+2x+$f_{sh}$ and a bandwidth $\Delta F_{CF}$. Accordingly, band pass filters 308-6, 308-7, 308-8, 308-9, 308-10 can correspond to 308-1, 308-2, 308-3, 308-4, 308-5 shifted by the frequency shift ($f_{sh}$).

FIG. 3B illustrates the impact of an additional frequency shift ($f_{sh}$) on the receiver, which does not expect any changes in reference frequency selection. In other words, the receiver can tune its comb band pass filters to reference frequency as specified in a standard. Accordingly, the received OFDM signal is equally shifted in frequency, which means signal sampling is less efficient due lower SNR caused be interferences from neighbor subcarriers. Therefore, the value of carried signal, derived from constellation diagram is incorrect or not determined. Therefore, an incorrect value can be passed to higher processing layers, which fails to decipher the content or fails in application of such settings, or there is a need for signal retransmission, or the procedure repetition. In other words, without the knowledge about the frequency shift ($f_{sh}$) pattern, proper information decoding is very challenging, especially when considering real time processing.

FIG. 3C illustrates an example implementation where the authorized UE is aware about additional frequency shift ($f_{sh}$) and has tuned its comb band pass filters to the shifted OFDM signal. Accordingly, there is no impact on signal sampling and processing is similar to processing in FIG. 3A.

Reference frequency $F_{REF}$ modification can be described by one of the following equations:

$$F_{REF} = F_{REF-0ffs} + \Delta F_{Global}(N_{REF} - N_{REF-0ffs}) \pm f_{sh}(f_{sh\,gr}, \text{Pattern}) \quad (1)$$

$$F_{REF,shift} = F_{REF} + \Delta_{shift} \pm f_{sh}(f_{sh\,gr}, \text{Pattern}) \quad (2)$$

where:

$f_{sh}$ is an additional frequency shift, which is known only for the authorized UE and the authorized BS, $f_{sh\ gr}$ is granularity of additional frequency shift, e.g., 1 kHz, or less, Pattern refers to $f_{sh}$ changes, where a new $f_{sh}$ may be used per symbol, subframe, frame, SFN, time or other criteria, and Other variables are defined in 3GPP TS 38.104 Chapter 5.4.2.1.

Thus, the value of $f_{sh}$ can depend on shift granularity and the value derived from the pattern. Granularity $f_{sh}$ gr may be standardized but pattern can be case specific and known for the authorized UE and the authorized BS only. The usage of unobvious pattern of the additional frequency shift ($f_{sh}$) changes can improve wireless communication (e.g., 5G, LTE, and the like) resilience for some jamming technologies and other threats that exploit information about known cell configuration and radio frame structure. In other words, example implementations can filter out unwanted or hostile UEs. Further, authorized UEs can have normal access to cell resources, as the pattern of the additional frequency shift ($f_{sh}$) changes is known by the authorized UE, thus the receiver is able to tune its comb band pass filter to the shifted frequencies.

Figure 4A:
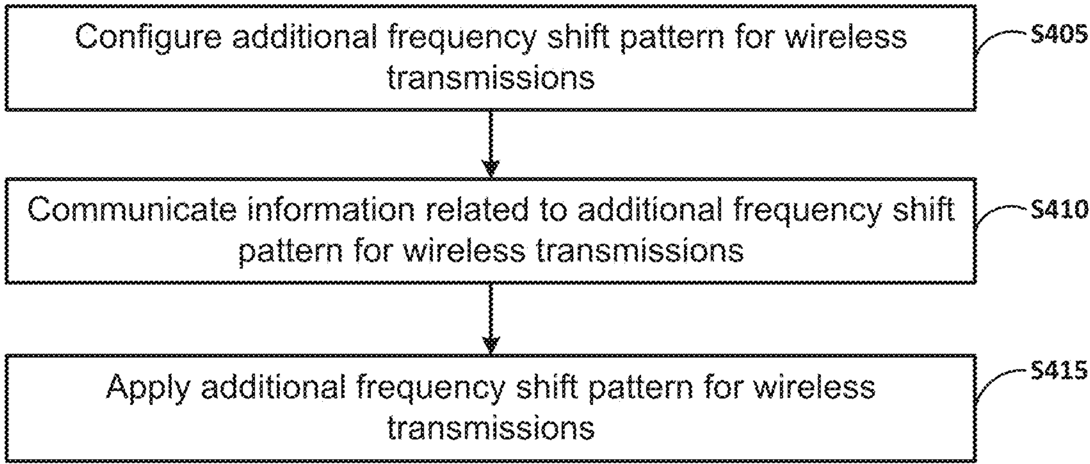
FIG. 4A is a block diagram of a method illustrating a network device communicating with a transmitter frequency shift according to an example embodiment.

FIG. 4A is a block diagram of a method illustrating a network device communicating with a transmitter frequency shift according to an example embodiment. As shown in FIG. 4A, in step S405 an additional frequency shift pattern is configured for wireless transmissions (e.g., uplink transmissions and/or downlink transmissions). For example, a transmitter (e.g., BS 134) can be configured by a control logic (e.g., included in the BS) to use additional frequency shift ($f_{sh}$) with a determined pattern. The control logic can be implemented as an additional software package installed at an authorized UE. For example, the UE can be associated with a safety critical networks to which access is granted to authorized UEs/Users only after proper verification. The control logic can require inputs such as keys, tokens, timestamps configured to ensure that the same the additional frequency shift ($f_{sh}$) value is received both at the transmitter and applied for radio transmission, and at the receiver, which receives such radio transmission.

In step S410 information related to additional frequency shift pattern for wireless transmissions is communicated to, for example, a UE. For example, the transmitter can communicate information to the authorized UE in order to inform the authorized UE about currently used or planned usage of the additional frequency shift ($f_{sh}$). Alternatively (or in addition), informing the authorized UE about currently used or planned usage of the additional frequency shift ($f_{sh}$) can be achieved by previously configured input data. This data can be communicated when the authorized UE is in RRC Connected state as such connection is secure, or as part of handover procedure. For example, the authorized UE can be in an RRC Connected state with a standard cell and is handed over to a target cell, which applies the additional frequency shift ($f_{sh}$) with a determined pattern. Also, if the cell uses combination of standard frequency allocation scheme and additional frequency shift concept, settings related to additional frequency shift configuration can be communicated similar to other UE configuration requests. Thus, cell radio resources are used to pass information related to the additional frequency shift ($f_{sh}$) in a secure manner. Alternatively (or in addition), information about the additional frequency shift ($f_{sh}$) can be communicated using other secure techniques or mechanisms, such as authentication tools, tokens, time related settings, other RATs, user inputs, and/or the like. For example, this example implementation can be useful when a new RRC connection request, when the authorized UE is in RRC Idle/Inactive state, and the cell already use additional frequency shift for radio transmissions.

In step S415 the additional frequency shift pattern for wireless transmissions is applied. For example, the transmitter (e.g., BS) can apply the additional frequency shift ($f_{sh}$) with a determined pattern. In other words, instead of transmissions at frequencies determined by $F_{REF}$ or $f_c$, the transmitter can use $F_{REF}(f_{sh})$ or $f_c+f_{sh}$, as determined using eqn. 1 and/or eqn. 2.

Figure 4B:
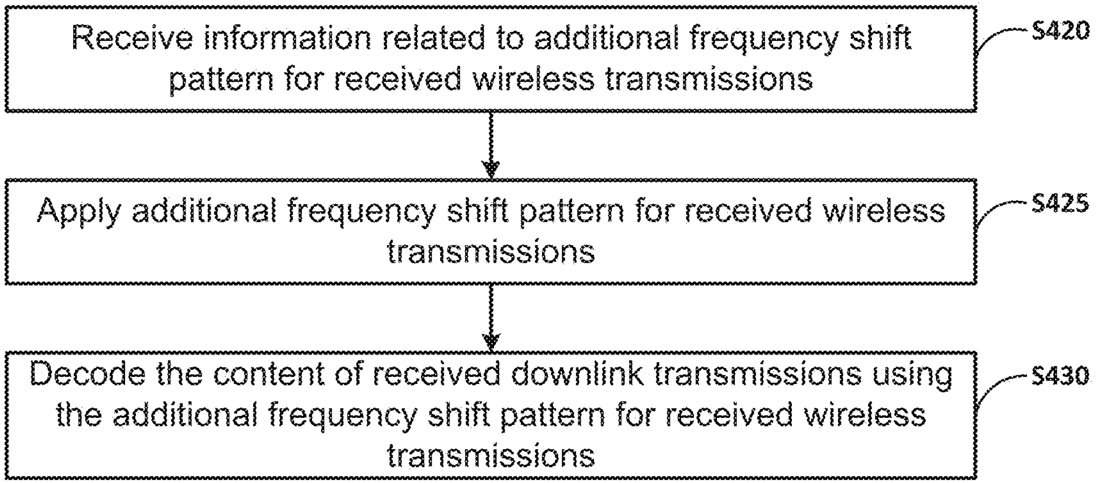
FIG. 4B is a block diagram of a method illustrating a user equipment communicating with a receiver frequency shift according to an example embodiment.

FIG. 4B is a block diagram of a method illustrating a user equipment communicating with a receiver frequency shift according to an example embodiment. As shown in FIG. 4B, in step S420 information related to additional frequency shift pattern for received wireless transmissions is received, for example, a UE. The information related to the additional frequency shift pattern for received wireless transmissions can be received by the receiver as described in step.

In step S425 the additional frequency shift pattern for received wireless transmissions is applied. For example, the authorized UE can be configured to use the usage of the additional frequency shift ($f_{sh}$) and can determine the pattern used by the given cell based on the received information related to additional frequency shift pattern for received wireless transmissions. As described above, the receiver can modify (e.g., shift) a band pass filter (e.g., the comb band pass filter) by the additional frequency shift ($f_{sh}$) in order to configure the receiver to be tuned to the shifted carrier frequency.

In step S430 the content of a received wireless transmissions is decoded using the additional frequency shift pattern for received wireless transmissions. For example, wireless signal processing (decoding) may not be changed (as compared to the standard), and transmitted content is correctly decoded similar way as in standard. In other words, the authorized UE can apply the shift and the process the correct transmitted pattern.

Figure 4C:
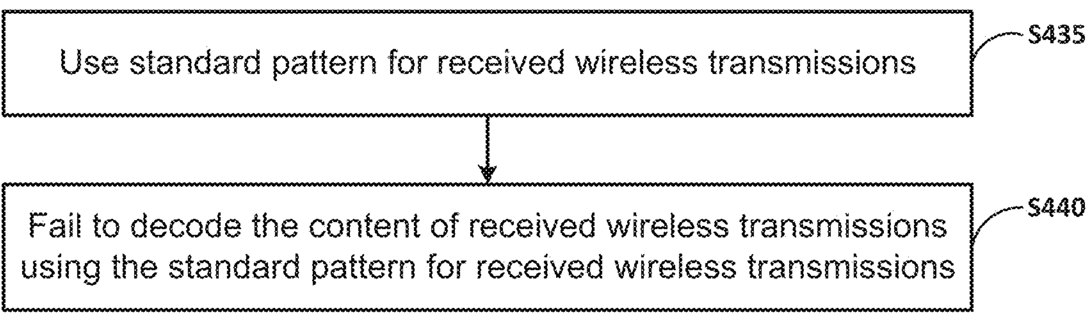
FIG. 4C is a block diagram of a method illustrating a user equipment communicating without a receiver frequency shift according to an example embodiment.

FIG. 4C is a block diagram of a method illustrating a user equipment communicating without a receiver frequency shift according to an example embodiment. As shown in FIG. 4C, in step S435 a standard configuration for received wireless transmissions is applied. In step S440 the content of received wireless transmissions fails to decode using the standard configuration for received wireless transmissions. The received wireless transmissions can fail to decode because the received transmission was transmitted using the additional frequency shift ($f_{sh}$).

Figure 5:
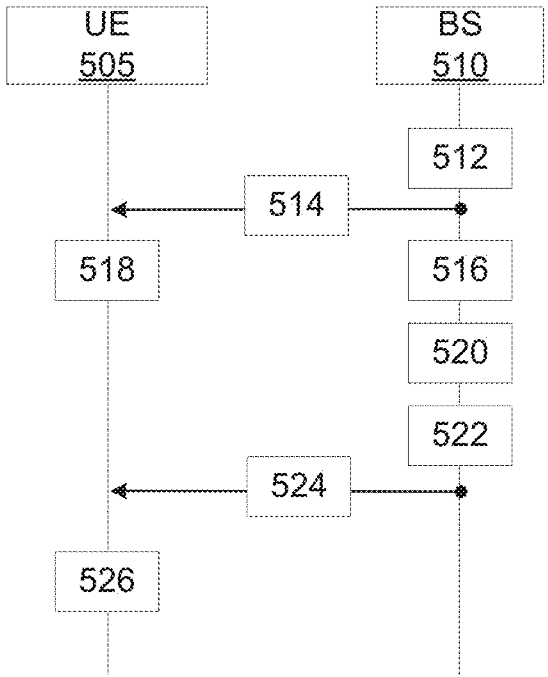
FIG. 5 is a block diagram illustrating a signal flow for communication with a frequency shift according to an example embodiment.

FIG. 5 is a block diagram illustrating a signal flow for communication with a frequency shift according to an example embodiment. As shown in FIG. 5, a network includes a user equipment (UE) 505 and a B510. The BS 510 can be a combination of devices. For example, the BS 510 can represent a BS and a core network device (or entity), the BS 510 can represent a BS and a control device (or entity), the BS 510 can represent a base station onboard a satellite, a satellite as a repeater and a terrestrial base station, and any other similar combination of network devices. A single device and/or the combination of devices can sometimes be referred to as a device, a system, and/or the like. The UE 505 can be a user device, a user terminal, a mobile device, a stationary device, an internet of things (IOT) device, any wirelessly (or cellular) connected device, and/or the like.

FIG. 5 illustrates an example implementation for additional frequency shift managing. As shown in FIG. 5, for wireless (e.g., downlink or uplink), the BS 510 (e.g., an authorized transmitter) and the UE 505 (e.g., the authorized receiver) can be equipped control logic configured to perform the implementations described herein. The control logic can be responsible for managing of the additional frequency shift pattern, which outcome is the additional frequency shift ($f_{sh}$) value applicable, depending on the application, for transmission or reception of the next Symbol, Subframe, Frame, the given SFN, time or other criteria. The control logic can be implemented as an additional software package installed at an authorized UE. For example, the UE can be associated with a safety critical networks to which access is granted to authorized UEs/Users only after proper verification. The control logic can require inputs such as keys, tokens, timestamps configured to ensure that the same the additional frequency shift ($f_{sh}$) value is received both at the transmitter and applied for radio transmission, and at the receiver, which receives such radio transmission.

The control logic can use inputs such as keys, tokens, timestamps configured to ensure that the same the additional frequency shift ($f_{sh}$) value is received both at the BS 510 and applied for radio transmission, and at the UE 505, which receives such radio transmission. In block 512 an additional frequency shift ($f_{sh}$) is determined. Determining the additional frequency shift ($f_{sh}$) is described in more detail above. For example, the additional frequency shift ($f_{sh}$) can be determined by the control logic using eqn. 1 and/or eqn. 2.

The BS 510 can communicate (e.g., wirelessly communicate) a message (block 514) that is received by the UE 505. The message can include information associated with the additional frequency shift ($f_{sh}$). The message (block 514) can be securely communicated to the UE 505. For example, message (block 514) can be communicated when UE 505 is in RRC Connected state, or via other interfaces, such as other RATs, keys, codes, tokens and the like, which also could be determined at UE side after proper authorization. Also, the direct value of the additional frequency shift ($f_{sh}$) may be delivered as part of inputs data, with clearly defined application details. In other words, the message can include the additional frequency shift ($f_{sh}$) value and/or information the UE 505 can use to determine the additional frequency shift ($f_{sh}$) value (e.g., RATs, keys, codes, tokens and the like).

In block 518, the UE 505 can determine the additional frequency shift ($f_{sh}$) and the signal pattern. In block 516 the BS 510 generates and/or receives a data stream. In block 520 the BS 510 uses the aforementioned control logic to generate the additional frequency shift ($f_{sh}$) signal pattern. In block 522 the BS 510 uses the aforementioned control logic to generate a signal based on the data stream using the additional frequency shift ($f_{sh}$) signal pattern. In block 524 the BS 510 communicates signal based on the data stream using the additional frequency shift ($f_{sh}$) signal pattern to the UE 505. In block 526, the UE 505 receives the signal from the BS 510 and decodes the signal using band pass filters configured based on the additional frequency shift ($f_{sh}$) and the signal pattern.

Example implementations described in this disclosure refer to wireless transmissions. However, the example implementations can be similarly applied to uplink transmissions.

The example implementations described in this disclosure utilize the fact that both transmitter and receiver possess proper frequency dynamic range, which allow to tune to any frequencies within specific band. In the basic application, dynamic frequency range should be equal ±x, i.e., subcarrier spacing range. Therefore, the example implementations can be applicable directly at radio unit, which is tuned by the additional frequency shift ($f_{sh}$) and, which value is derived from the control logic.

At the authorized receiver side (e.g., UE 131, UE 505), same inputs can be communicated to the control logic responsible for additional frequency shift pattern recognition. The control logic can give the same result as the transmitter (e.g., BS 134, BS 510). Then, based on the control logic feedback, the additional frequency shift ($f_{sh}$) can be applied for comb band pass filter to allow the receiver to be tuned to the shifted carrier frequency. Finally, signal detection and sampling can be performed in optimal conditions, so the proposed Method is considered as transparent for the authorized UEs.

In the example of the not authorized UEs, the pattern is not recognized due its changes in relatively short time. Therefore, signal decoding and sampling is less efficient, which leads to incorrect value decoding or for retransmissions. In case of detecting cell broadcast, also failure is expected at Cell Search or Cell Selection/Cell Reselection stage.

Figure 8:
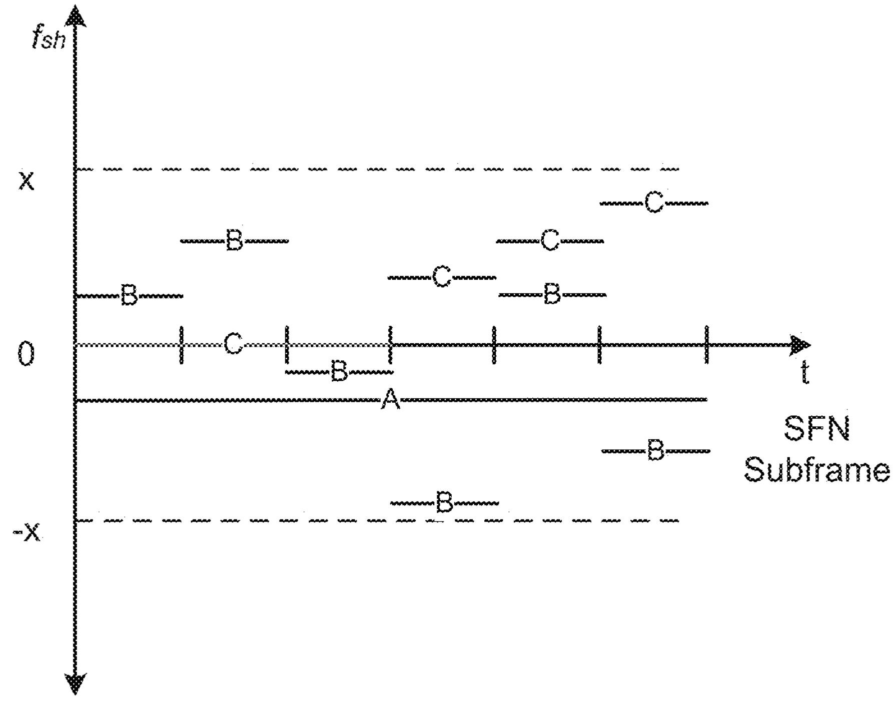
FIG. 8 is a signal graph of shift patterns according to an example embodiment.

FIG. 8 is a signal graph of shift patterns according to an example embodiment. FIG. 8 can illustrate examples of additional frequency shift patterns. Additional frequency shift can be applied within the limits defined by the value of subcarrier carrier spacing, i.e. (−x, x), e.g. (−15 kHz, 15 kHz). Other's subcarrier spacings may also considered, e.g., 30 kHz, 60 kHz or 120 kHz, as this can be implementation specific.

Additional frequency shift ($f_{sh}$) can be applied with agreed granularity, $f_{sh}$ gr, e.g., 1 kHz, or less. If additional frequency shift is approaching the value of x, i.e., $f_{sh}$=0.9x, or $f_{sh}$=14 kHz for x=15 kHz, an unaware receiver may interpret received signal as related to a neighbor subcarrier, i.e., $f_c$+x, which also is incorrect. However, the value of signal may be better sampled due almost fitting to the neighbor comb band pass filter. An aware receiver may have no problem with assigning this signal correctly to $f_c$. Additionally, using shifts higher than x also may be considered, however it may be less practicable due possible exceeding bands limits.

The lines labelled as A can illustrate an example shift pattern having a constant shift. The shift pattern (label A) can have a constant shift that is sufficient to exclude not authorized UEs. However, the shift pattern (label A) may be recognized by some jammer technologies than may be configured to use a try and error approach or scan the frequency spectrum.

The lines labelled as B can illustrate an example shift pattern having a pseudorandom shift that can be sufficient to exclude the not authorized UEs and some jammer technologies. If the applied pseudorandom pattern is not intuitive and not obvious, some jammer technologies may not be able to determine the exact pattern and predict the next additional frequency shift. The only option available for some jammer technologies may be to record every possible frequency shift as a separate data stream and then try to decode carried values. However, due to real time processing and significant number of additional frequency shift ($f_{sh}$) combinations, and the need for jointly decoding the information passed via radio interface, this task may be too complicated.

The lines labelled as C can illustrate an example shift pattern having a mixed approach, in which by an agreed period, no additional frequency shift ($f_{sh}$) is added, and after this period, pseudorandom additional frequency shift is applied with agreed pattern. The benefit of the shift pattern labelled C can be that unaware UEs and/or aware UEs can decode cell configuration, establish RRC Connection, or at least perform UE authentication procedure, or benefit from provided by the authorized Base Station services. After successful authentication, a UE can be provided with information about pseudorandom additional frequency shift pattern directly or by inputs data, or the next additional frequency shift ($f_{sh}$) value or values applicable for certain period or other criteria, in a safe manner, as data cyphering is applied.

For example, no additional frequency shift ($f_{sh}$) is used by configured number of consecutive SFNs, e.g., 20-30 (200-300 ms) after each hundred of SFNs, or based on time rules, e.g., at the beginning of each second for 20-30 consecutive SFNs. Thus, the cell may operate as standard cell and allow access but only in clearly defined periods. Then, the cell can switch to a protected mode with an additional frequency shift with clearly specified pattern. Thus, even if jamming is applied, its efficient impact is present only in short periods or SFNs, where the cell works with standard settings. Once additional frequency shift is applied again, the not authorized UEs may fail in correct signal detection. However, an authorized UE, which is fully synchronized still benefits from the provided services, or even is able to establish connection when additional frequency shift is applied.

Considering potential jamming of synchronization signals PSS/SSS, which could be mitigated by dynamically allocated additional PSS/SSS, details related to these signal positions may need to be passed, when additional frequency shift is applied, or in other secure way, which prevent from easy recognition and detection of such signals by the unauthorized, and especially hostile UEs.

In this context, the probability that the given frequency is used as carrier frequency in the given Subframe can be described by the following equation:

$$P_d(\text{Number of } f_{sh} \text{ combinations}) = \frac{100\%}{\text{Number of } f_{sh} \text{ combinations}} \quad (3)$$

where:

Number of $f_{sh}$ combinations refers to a number of significantly different data streams needed for unambiguous signal decoding after sampling with existing additional frequency shift defined by $f_{sh}$ gr, and $P_d$ (Number of $f_{sh}$ combinations) is a probability that the signal is carried by the specified data stream.

Although certain similarities, additional frequency shift $f_{sh}$ added to carrier frequency cannot be compensated similarly like Doppler effect, which cause frequency offset for UE in a motion towards Base Station. Doppler effect compensation requires that the receiver is aware about exact carrier frequency, thus the value of Doppler frequency offset can be easily determined. In this context, if the unauthorized UE compensate additional frequency shift $f_{sh}$ same way as Doppler effect, the reference will be carrier frequency, and not carrier frequency with additional frequency shift $f_{sh}$. Therefore, such compensation will be incorrect. However, in case of the authorized UE, the receiver is aware about applied additional frequency shift $f_{sh}$, thus carrier frequency with additional frequency shift $f_{sh}$ will be used as reference to compensate any additional frequency offset caused by Doppler effect, which means proper signal detection and decoding can be achieved.

Additional frequency shift $f_{sh}$ cannot be also considered as carrier frequency accuracy issue. In wireless communication, there is a need for high carrier frequency accuracy, which shall not exceed +/−0.05 ppm for wide area, and +/−0.1 ppm for medium and local area, as specified in 3GPP TS 38.104. Additional frequency shift $f_{sh}$ can be higher than minimal frequency error, e.g., 1 kHz. However, if the unauthorized UE consider additional frequency shift $f_{sh}$ as carrier frequency error and compensate it, the effect of compensation will be incorrect, as carrier frequency will be used as reference. In the same time, the authorized UE is aware that additional frequency shift $f_{sh}$ has been added to carrier frequency, thus carrier frequency error compensation can be correct.

Figures 6, 7:
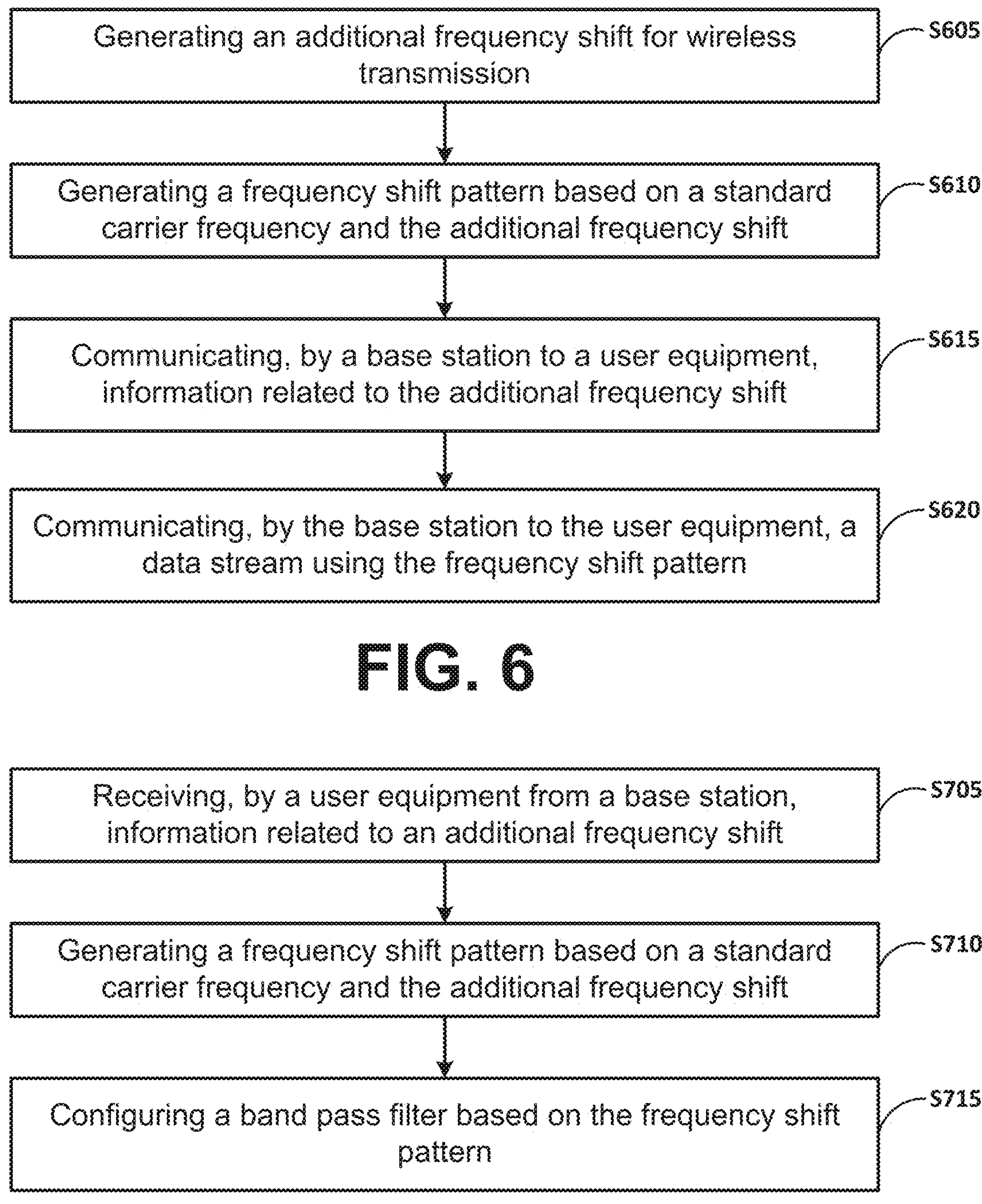
FIG. 6 is a block diagram of a method of operating a base station according to an example embodiment.
FIG. 7 is a block diagram of a method of operating a user equipment according to an example embodiment.

Example 1. FIG. 6 is a block diagram of a method of operating a base station according to an example embodiment. As shown in FIG. 6, in step S605 the method includes generating an additional frequency shift for wireless transmission. In step S610 the method includes generating a frequency shift pattern based on a standard carrier frequency and the additional frequency shift. In step S615 the method includes communicating, by a base station to a user equipment, information related to the additional frequency shift. In step S620 the method includes communicating, by the base station to the user equipment, a data stream using the frequency shift pattern.

Example 2. The method of Example 1, wherein information related to the additional frequency shift can be one of an additional frequency shift value or data that can be used to determine the additional frequency shift value.

Example 3. The method of Example 2, wherein the data that can be used to determine the additional frequency shift value can include at least one of an authentication tool, a token, a time related setting, and a user input.

Example 4. The method of any of Example 1 to Example 3, wherein the information related to the additional frequency shift can be communicated when the user equipment is in an RRC Connected state.

Example 5. The method of any of Example 1 to Example 4, wherein the information related to the additional frequency shift can be communicated using at least one of authentication tools, tokens, time related settings, radio access technology, and user inputs.

Example 6. The method of any of Example 1 to Example 5, wherein the frequency shift pattern can be generated based on a shift granularity and a value derived from a pattern, the pattern can be based on a frequency shift change, and a new a frequency shift can be used at least one of per symbol, per subframe, per frame, per single-frequency network, and per specified time.

Example 7. The method of any of Example 1 to Example 6, can further include receiving, by the base station from the user equipment, an uplink data stream communicated using the frequency shift pattern.

Example 8. The method of any of Example 1 to Example 7, wherein the data stream can be communicated as an Orthogonal Frequency Division Multiplexing signal on a carrier frequency shifted based on the frequency shift pattern.

Example 9. The method of any of Example 1 to Example 8, wherein the additional frequency shift can be only known by the base station and the user equipment.

Example 10. The method of any of Example 1 to Example 9, wherein an additional frequency shift value can be limited based on a subcarrier spacing.

Example 11. FIG. 7 is a block diagram of a method of operating a user equipment according to an example embodiment. As shown in FIG. 7, in step S705 the method includes receiving, by a user equipment from a base station, information related to an additional frequency shift. In step S710 the method includes generating a frequency shift pattern based on a standard carrier frequency and the additional frequency shift. In step S715 the method includes configuring a band pass filter based on the frequency shift pattern.

Example 12. The method of Example 11 can further include receiving, by the user equipment from the base station, a data stream communicated using the frequency shift pattern, and decoding the data stream using the band pass filter configured based on the frequency shift pattern.

Example 13. The method of Example 12, wherein the data stream can be communicated as an Orthogonal Frequency Division Multiplexing signal on a carrier frequency shifted based on the frequency shift pattern.

Example 14. The method of Example 11 to Example 13 can further include communicating, by the user equipment to the base station, an uplink data stream communicated using the frequency shift pattern.

Example 15. The method of Example 11 to Example 14, wherein the additional frequency shift can be only known by the base station and the user equipment.

Example 16. The method of Example 11 to Example 15, wherein an additional frequency shift value can be limited based on a subcarrier spacing.

Example 17. A method can include any combination of one or more of Example 1 to Example 16.

Example 18. A non-transitory computer-readable storage medium comprising instructions stored thereon that, when executed by at least one processor, are configured to cause a computing system to perform the method of any of Examples 1-17.

Example 19. An apparatus comprising means for performing the method of any of Examples 1-17.

Example 20. An apparatus comprising at least one processor and at least one memory including computer program code, the at least one memory and the computer program code configured to, with the at least one processor, cause the apparatus at least to perform the method of any of Examples 1-17.

Figure 9:
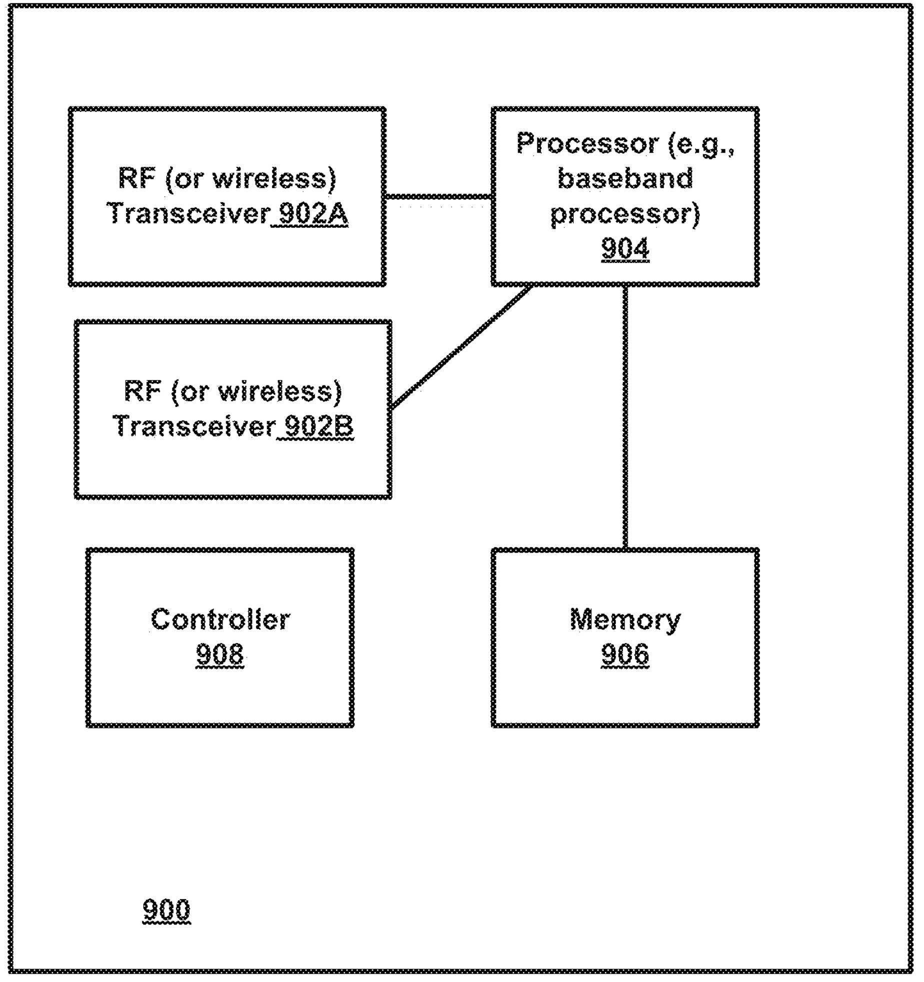
FIG. 9 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 9 is a block diagram of a wireless station 900 or wireless node or network node 900 according to an example embodiment. The wireless node or wireless station or network node 900 may include, e.g., one or more of an AP, BS, gNB, RAN node, relay node, UE or user device, network node, network entity, DU, CU-CP, CU-UP, . . . or other node according to an example embodiment.

The wireless station 900 may include, for example, one or more (e.g., two as shown in FIG. 9) radio frequency (RF) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The example embodiments are not, however, restricted to the system that is given as an example, but a person skilled in the art may apply the solution to other communication systems. Another example of a suitable communications system is the 5G (including 5G-Advanced) system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates. Another example of a suitable communications system is the 6G system. It is assumed that network architecture in 6G will be similar to that of the 5G.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A base station, comprising:

at least one processor; and at least one memory including computer program code, the at least one memory and the computer program code configured to, with the at least one processor, cause the base station at least to:

authenticate a user equipment (UE) and establish a Radio Resource Control (RRC) connection with the authenticated UE;

in response to the authentication, generate an additional frequency shift with a granularity of 1 kHz or less for wireless transmission to the UE, wherein:

the additional frequency shift is only known to the base station and the UE to prevent unauthorized prediction of the additional frequency shift, a value of the additional frequency shift is limited based on a subcarrier spacing, and information related to the additional frequency shift comprises one of: the value of the additional frequency shift or data from which the value of the additional frequency shift is determined, wherein the data includes at least one of an authentication tool, a token, a time related setting, a radio access technology, and a user input;

based on a standard carrier frequency and the generated additional frequency shift, generate a pseudorandom frequency shift pattern configured to cause the wireless transmission appear as noise to an unauthorized receiver, wherein the pseudorandom frequency shift pattern comprises a sequence of frequency shift values to be applied to the standard carrier frequency on a per symbol, per subframe, per frame, per single-frequency network, or per specified time basis;

communicate, to the UE in the RRC connected state, the information related to the additional frequency shift and the pseudorandom frequency shift pattern;

generate an Orthogonal Frequency Division Multiplexing (OFDM) signal comprising a downlink data stream; and communicate, to the UE, the OFDM signal on a carrier frequency that is shifted according to the pseudorandom frequency shift pattern to lower a signal to noise ratio (SNR) for the unauthorized receiver.

2. The base station of claim 1, wherein the at least one memory and the computer program code are configured, with the at least one processor, to cause the base station further to:

receive, from the user equipment, an uplink data stream communicated using the pseudorandom frequency shift pattern.

3. The base station of claim 1, wherein the additional frequency shift is within a first range defined by a subcarrier spacing of the OFDM signal such that the additional frequency shift is within a second range relative to the standard carrier frequency, where the second range corresponds to the subcarrier spacing.

4. The base station of claim 3, wherein the pseudorandom frequency shift pattern is generated based on a cryptographic key, a token, and a timestamp shared between the base station and the UE, wherein generating the pseudorandom frequency shift pattern comprises determining a sequence of additional frequency shift values according to a defined shift granularity, and wherein the pseudorandom frequency shift pattern causes the carrier frequency to change according to different additional frequency shift values for consecutive symbols, subframes, frames, or single-frequency network periods.

5. The base station of claim 4, wherein communicating the information related to the additional frequency shift comprises transmitting the information during the RRC connected state using encrypted signaling, and wherein the base station is further configured to receive an uplink OFDM signal from the UE transmitted using the pseudorandom frequency shift pattern.

6. The base station of claim 5, wherein the pseudorandom frequency shift pattern comprises a plurality of additional frequency shift values selected according to the shift granularity, wherein the OFDM signal comprises subcarriers shifted from the standard carrier frequency according to the pseudorandom frequency shift pattern.

7. The base station of claim 6, wherein the pseudorandom frequency shift pattern is configured such that a receiver tuned to the standard carrier frequency experiences reduced signal-to-noise ratio and fails to correctly decode the OFDM signal.

8. A user equipment (UE), comprising:

at least one processor;

a band pass filter; and at least one memory including computer program code, the at least one memory and the computer program code configured to, with the at least one processor, cause the UE at least to:

receive, from a base station in RRC connected state, information related to an additional frequency shift, wherein:

the additional frequency shift has a granularity of 1 kHz or less for wireless transmission, the additional frequency shift is only known to the base station and the UE to prevent unauthorized prediction of the additional frequency shift, a value of the additional frequency shift is limited based on a subcarrier spacing, and the information related to the additional frequency shift comprises one of: the value of the additional frequency shift or data from which the value of the additional frequency shift is determined, wherein the data includes at least one of an authentication tool, a token, a time related setting, a radio access technology, and a user input;

based on a standard carrier frequency and the additional frequency shift, generate a pseudorandom frequency shift pattern configured to cause the wireless transmission appear as noise to an unauthorized receiver, wherein the pseudorandom frequency shift pattern comprises a sequence of frequency shift values to be applied to the standard carrier frequency on a per symbol, per subframe, per frame, per single-frequency network, or per specified time basis;

configure the band pass filter based on the pseudorandom frequency shift pattern to tune to a carrier frequency that is shifted according to the pseudorandom frequency shift pattern;

receive, from the base station, an Orthogonal Frequency Division Multiplexing (OFDM) signal comprising a downlink data stream on the carrier frequency that is shifted according to the pseudorandom frequency shift pattern; and based on the pseudorandom frequency shift pattern, decode the downlink data stream.

9. The UE of claim 8, wherein the at least one memory and the computer program code are configured, with the at least one processor, to cause the UE further to:

communicate, to the base station, an uplink data stream communicated using the pseudorandom frequency shift pattern.

10. The UE of claim 8, wherein the additional frequency shift is within a range defined by a subcarrier spacing of the OFDM signal such that the additional frequency shift is within −x to +x of the standard carrier frequency, where x corresponds to the subcarrier spacing.

11. The UE of claim 10, wherein configuring the band pass filter comprises shifting a comb band pass filter such that center frequencies of the comb band pass filter correspond to shifted subcarrier frequencies of the OFDM signal.

12. The UE of claim 11, wherein the pseudorandom frequency shift pattern is generated based on at least one of a cryptographic key, a token, or a timestamp shared between the UE and the base station.

13. The UE of claim 12, wherein the pseudorandom frequency shift pattern causes the carrier frequency to change according to different additional frequency shift values for consecutive symbols, subframes, frames, or single-frequency network periods.

14. The UE of claim 13, wherein the UE determines the additional frequency shift based on the received information and configures the band pass filter to align with a shifted carrier frequency corresponding to the additional frequency shift.

15. The UE of claim 14, wherein the UE further transmits an uplink OFDM signal to the base station using the pseudorandom frequency shift pattern.

16. The UE of claim 15, wherein the pseudorandom frequency shift pattern includes a plurality of additional frequency shift values selected according to a defined shift granularity, wherein the UE compensates for Doppler frequency offset using the carrier frequency shifted according to the pseudorandom frequency shift pattern as a reference frequency, and wherein the pseudorandom frequency shift pattern is configured such that an unauthorized receiver that tunes to the standard carrier frequency experiences reduced signal-to-noise ratio and fails to correctly decode the OFDM signal.

17. A method comprising:

receiving, by a user equipment (UE) from a base station in RRC connected state, information related to an additional frequency shift, wherein:

the additional frequency shift has a granularity of 1 kHz or less for wireless transmission, the additional frequency shift is only known to the base station and the UE to prevent unauthorized prediction of the additional frequency shift, a value of the additional frequency shift is limited based on a subcarrier spacing, and the information related to the additional frequency shift comprises one of: the value of the additional frequency shift or data from which the value of the additional frequency shift is determined, wherein the data includes at least one of an authentication tool, a token, a time related setting, a radio access technology, and a user input;

based on a standard carrier frequency and the additional frequency shift, generating a pseudorandom frequency shift pattern configured to cause the wireless transmission appear as noise to an unauthorized receiver, wherein the pseudorandom frequency shift pattern comprises a sequence of frequency shift values to be applied to the standard carrier frequency on a per symbol, per subframe, per frame, per single-frequency network, or per specified time basis;

configuring a band pass filter based on the pseudorandom frequency shift pattern to tune to a carrier frequency that is shifted according to the pseudorandom frequency shift pattern;

receiving, from the base station, an Orthogonal Frequency Division Multiplexing (OFDM) signal comprising a downlink data stream on the carrier frequency that is shifted according to the pseudorandom frequency shift pattern; and based on the pseudorandom frequency shift pattern, decoding the downlink data stream.

18. The method of claim 17, further comprising:

communicating, to the base station, an uplink data stream communicated using the pseudorandom frequency shift pattern.

* * * * *